Patented Dec. 29, 1953

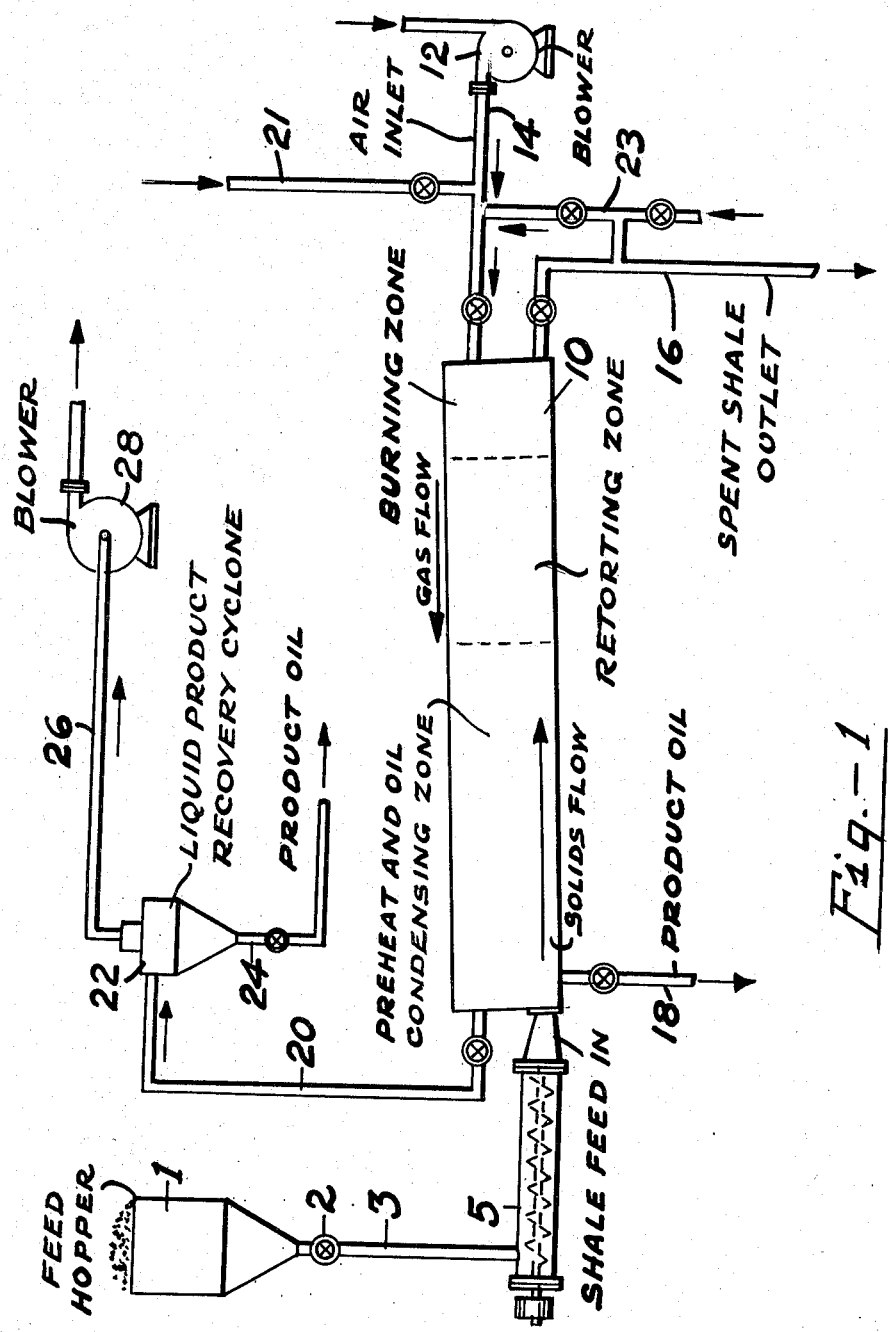

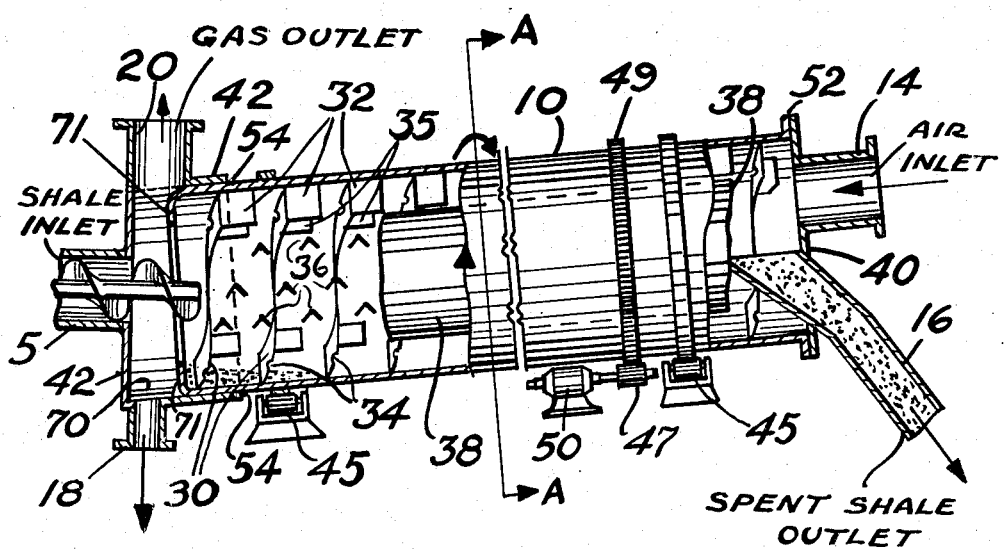
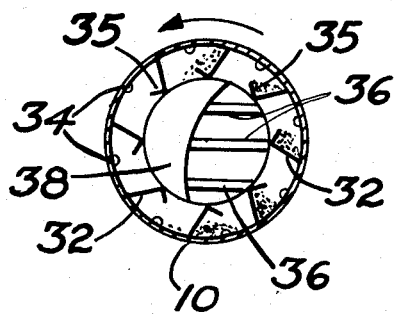

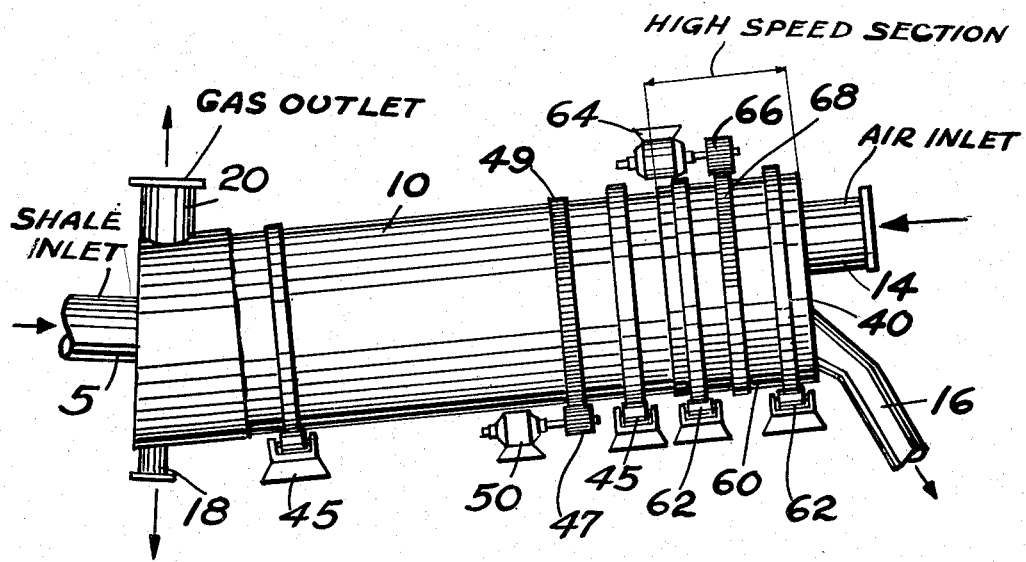
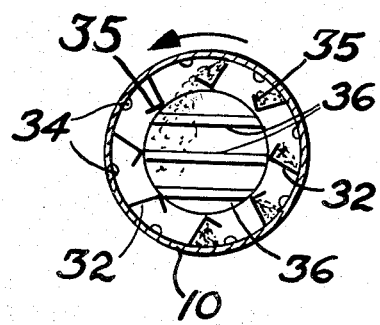

2,664,389

UNITED STATES PATENT OFFICE 2,664,389

PROCESS AND APPARATUS FOR THE DISTILLATION OF SOLIDS

Walter A. Rex, Westfield, and Herbert H. Vickers, Union, N. J., assignors to Standard Oil Development Company, a corporation of Delaware Application April 1, 1949, Serial No. 84,778

10 Claims. (Cl. 202—6)

The present invention relates to an improved process and rotary retort for the distillation of solids containing volatizable constituents. More particularly, the invention is concerned with an improved process for the distillation of carbonizable solids such as various oil-bearing minerals including oil shale, oil sands, coals, lignite, cellulosic materials, and the like, and with a novel rotary retort useful for this process.

Rotary kilns have been used heretofore for various heat treating purposes such as calcination, drying, distillation and other treatments of subdivided solids requiring an efficient heat exchange of solids and gases. These rotary vessels have in the past been so designed and operated that the subdivided solid charge is moved from the elevated feed and toward the lowered discharge end of an inclined rotating vessel, under the influence of gravity aided by the rotating motion of the vessel. So-called lifting blades have frequently been attached to the inner wall of the vessel, by means of which the solid material is lifted from the bottom to the top of the vessel and then cascaded back to the bottom in the course of the rotation, in order to improve the contact and heat transfer between solids and gases. Heat has been supplied either by direct heating with hot gases flowing concurrently or countercurrently to the solids through the retort or by indirect heating means through the retort walls. All these arrangements have certain disadvantages for the distillation of solids containing volatilizable constituents which are to be recovered in liquid form.

Concurrent flow of heating gases and solids through the rotating vessel in direct heat exchange with each other is unsatisfactory for treatment of a solid containing volatilizable recoverable fuel products since some of the valuable liquid products would be burned near the entrance end of the kiln where the highest temperatures are reached. Indirect heating may involve excessive wall temperatures to obtain the desired heat transfer to the solids being treated and thus may be conducive to an undesirable decomposition of distillation products in contact with the overheated vessel walls. Furthermore, the small heat transfer area and the poor heat transfer characteristics would seriously limit the capacity of an indirectly heated retort. Countercurrent flow of solids and heating gases in direct heat exchange involves condensation of distillation products in sections adjacent to the elevated solids feed end of the retort, and a continuous flowing back of liquid condensate toward the lowered solids discharge end, resulting in undesirable heat losses and product decomposition. If the temperature throughout the retort is maintained substantially above the condensation point of the distillate, expensive special condensation and gas-liquid separation equipment must be provided.

The present invention overcomes the aforementioned difficulties and affords various additional advantages as will be apparent from the subsequent description of the invention, read with reference to the accompanying drawing.

In accordance with the present invention, subdivided solids to be subjected to a distillation or similar heat treatment are supplied to the lowered end of an inclined rotary retort and moved from this lowered solids feed end over the length of the rotary retort in a strongly agitated tumbling motion to its elevated solids discharge end while heating gases flow countercurrently to, and in direct heat exchange with, the solids from the elevated solids discharge end to the lowered solids feed end of the rotary retort. In this manner, the invention makes use of the relatively high efficiency of heat utilization and transfer inherent in countercurrent, direct heat transfer operation of rotary retorts and at the same time avoids recirculation of any liquid distillate condensing in the relatively cold lowered retort sections, back to relatively hot elevated retort sections and its inherent disadvantages.

In accordance with the preferred embodiment of the invention, the process is so operated that the solids in a portion of the rotary retort adjacent to the lowered solids feed end achieve a temperature substantially below the condensation temperature of the major portion of the distillate which is to be recovered, and so that the temperature of the upwardly moving solids is steadily increased until a temperature level conducive to a substantially complete distillation of the volatilizable constituents of the solids is reached well before the solids are discharged from the elevated solids discharge end of the rotary retort. In this manner, at least a substantial proportion of the distillate may be condensed on the relatively cold solids within the retort portions adjacent to the solids feed end, giving up their sensible heat and their heat of condensation to the incoming solids. These retort portions, therefore, act simultaneously as a distillate condensing or gas-liquid separating section and as a solids preheat section of increased efficiency. Liquid distillate may be readily removed from the lowermost portion of the rotary retort.

Any distillate carried by the discharging heating gases in the form of vapors and/or liquid entrainment may be separated and recovered by inexpensive cooling, absorption and/or centrifugal gas-liquid separating means.

Operation in accordance with this preferred embodiment of the invention lends itself with greatest advantage to the distillation or carbonization of carbonizable solids of the type specified above and particularly to the distillation of oil shale. In this case, the subdivided carbonizable solids charge is supplied to the lowered end of the inclined rotary retort substantially at room temperature and moved upwardly through the retort in a highly agitated tumbling motion while air is supplied to the elevated end of the retort at a temperature sufficiently high to support a combustion of the carbonized solids. The hot combustion gases move downwardly through the rotary retort countercurrently to the upwardly moving tumbling solids which are heated and distilled thereby as they approach the combustion zone in the elevated discharge end of the retort. Vapors carried by the flue gases are cooled on the solids feed in the lower retort portions, condensed and recovered as above described.

Heretofore, oil shale has been distilled by moving the fresh shale in the form of a compact column of subdivided solids upwardly through a vertical shaft countercurrently to hot combustion gases produced by blowing air in the top of the shaft, and collecting condensed distillate in the bottom of the shaft. However, this type of operation is subject to hanging and bridging of the charge and gas channeling aggravated by the strong tendency of the shale to disintegrate to a fine powder in the course of the distillation. In addition, a complicated and powerful solids feed mechanism is required to overcome the weight of the solids column resting on the bottom of the shaft. These difficulties are completely avoided by the process of the present invention while all advantages inherent in a countercurrent type of operation are retained.

The upward movement of the subdivided solids through the inclined rotary retort may be accomplished with greatest efficiency in accordance with the present invention by means of specially designed lifting flights and blades moving the solids both forward and backward in a manner resulting in an overall upward and forward motion of the solids through the retort, and simultaneously in complete mixing as well as the eventual discharge of the solids at the elevated rather than the lowered end of the rotary retort.

The design of a retort suitable for the purposes of the invention and all other aspects of the present invention will be best understood from the following detailed description of the accompanying drawing wherein Figure 1 is a schematical illustration of a system suitable to carry out a preferred embodiment of the process of the invention;

Figure 2 shows a rotary retort designed in accordance with the invention, partly in a vertical section along the retort axis, partly in side elevation;

Figure 3 is a cross-section along line A—A of Figure 2;

Figure 4 is a similar cross-section illustrating modifications of certain elements of Figure 2; and Figure 5 is a side view of a retort of the type illustrated in Figures 2 and 3 modified by certain additional desirable features.

Referring now to Figure 1, the system illustrated therein will be described below using the distillation of oil shale as an example for the utility of the process of the invention. It is noted, however, that systems of this type may be used in a substantially analogous manner for the distillation or carbonization of other carbonizable materials and quite generally for the recovery of volatilizable constituents from subdivided solids containing the same.

The essential element of Figure 1 is a rotary retort 10 supported in an inclined position and rotated by means well known in the art of rotary kilns and shown in greater detail in Figures 2 and 5 of the drawing. In operation, fresh oil shale crushed to a suitable size of, say, about 10 mesh to 1 inch particle diameter is supplied to feed hopper 1 and passed through line 3 to the lowered end of inclined retort 10 by any conventional feeding means adapted to transport subdivided solids at a controlled rate. A screw conveyor 5 is shown for this purpose in Figure 1 by way of example. If desired, the solids feed rate to screw conveyor 5 may be additionally controlled by means of a slide valve 2 in line 3.

The shale entering the lowered feed end of retort 10 is moved upwardly toward the elevated end of the retort in a tumbling highly agitated motion actuated by the rotation of the retort and combined flight screw and lifting means which will be described below in greater detail with reference to Figures 2 and 3. Simultaneously, air is fed by blower 12 through line 14 to the elevated end of retort 10. Spent shale is withdrawn from the elevated retort end through line 16 which is so designed that its solids content exhibits a gas flow resistance sufficiently high to provide an effective gas seal preventing air and other gases from escaping through discharge line 16. Gases are withdrawn from the lowermost end of retort 10 through line 20 as will appear more clearly hereinafter. In this manner, countercurrent flow of solids and gases is maintained over the entire length of retort 10.

When starting up the process, extraneous fuel such as gas or oil supplied through line 21 may be burned to bring the empty retort to a temperature of about 1000° F. after which the fresh shale feed may be introduced and gradually brought up to the desired feed rate. After the shale leaving the elevated end of the retort has reached a temperature level sufficient to maintain combustion at such a rate that the shale entering the zone of combustion reaches a temperature of about 900°–1000° F., the gas or oil fuel may be cut off. Since the hot shale withdrawn through line 16 will usually contain residual coke and is above ignition temperature, it is preferably cooled below ignition temperature in any suitable manner before its final disposal.

The hot combustion gases flowing countercurrently to the shale heat the shale progressively up to the combustion temperature as it approaches the combustion zone while the gases are progressively cooled down on their path through the retort. When the shale reaches a temperature of about 800°–1000° F. its kerogen content is broken down to hydrocarbon vapors which are carried along by the combustion gases. The gas mixture is cooled off progressively as it gives off its heat to the countercurrently flowing shale until condensation temperatures of the entrained hydrocarbon vapors and even lower temperatures are reached. Oil condenses on the shale and this adds to the preheating effect of the gases. The condensed oil collects in the bottom of retort 10 and flows toward the lowered end of the retort where it is withdrawn through line 18. Means (not shown) are provided to prevent solids from entering line 18. The feed rates of solids and gases through retort 10 and the mechanical design and operation of retort 10 may be readily so controlled that at least the major proportion, say about 85 to 95%, of the volatilizable shale constituents is liberated and condensed within retort 10 and that the gases adjacent to the lowered end of retort 10 may reach a temperature of, say, about 150°–400° F., preferably about 150°–350° F., at combustion temperatures of the order specified above.

Spent heating gases, which may still contain some entrained liquid distillate and some distillate vapors of a relatively low condensation temperature, are withdrawn from the lower end of retort 10 through line 20. They may be passed through conventional gas-liquid separating means such as a liquid recovery cyclone 22 from which the separated oil may be recovered through line 24. The gas leaving cyclone 22 through line 26 may be further processed for additional oil recovery by conventional means including cooling, absorption, and/or adsorption for light end recovery or used as a fuel. The flow of gases through the system may be facilitated by the arrangement of a blower 28 taking suction from line 26 and cyclone 22.

While combustion of shale within rotary retort 10 has been specified as the means for generating the heat required for the distillation of the shale, it will be appreciated that other means may be used. For example, substantially inert gases, such as hot flue gases, nitrogen, or highly superheated steam may be introduced through line 14 to perform functions similar to the hot combustion gases generated in the elevated retort end in accordance with the above example. An additional method of carrying out combustion is to recirculate to the air inlet 14 a portion of the discharged shale stream in line 16 through line 23. Furthermore, in some cases it may be advantageous to burn fuel gas recovered from the process to supply at least a portion of the heat requirement.

Referring now to Figure 2, there is shown a rotary retort of the type of retort 10 of Figure 1 on an enlarged scale, partly in section and partly in elevation in order to illustrate those specific design features in greater detail which are instrumental in transporting the subdivided solids feed from the lower end upwardly to the elevated end of the inclined retort. Elements similar to those appearing in Figure 1 are identified by like reference characters.

As shown in Figure 2, rotary retort 10 is provided with feeding flights 30 arranged in the form of a continuous spiral screw rotating with retort 10. Lifting blades 32 are attached to feeding flights 30 in such a manner that they lift up a portion of the solids from the bottom of the channel formed by the continuous flight spiral screw as retort 10 rotates in the direction of the arrows shown at the broken outline in the middle section of retort 10. Solids lifted by lifting blades 32 drop back into the bottom of the spiral channel in the form of a cascading spray when blades 32 reach a more elevated position on their rotary course. In falling from their elevated position some of the solids cross the wall of the spiral screw to a point almost one full pitch behind in the spiral flight. Flights 30 are provided with drain holes 34 permitting the downward flow of liquid condensate along the bottom of retort 10. Forward motion of solids is accomplished mainly by their sliding along the advancing screw flights and partially by their cascading from the lifting blades 32, into a more advanced position of the channel. This combination of cascading and sliding results in excellent mixing similar to that obtained in a conventional concrete mixer. This mixing effect is of considerable significance because it provides for an efficient heat exchange between hot solids which have cascaded through the hot stream of heating gases and cooler solids which have not been picked up by blades 32 and have thus missed the cascade through the heating gases.

An important element of the present invention resides in the length, location and number of the lifting blades 32. If these blades were equal in length to the pitch of the screw formed by flight 30, the blades 32 would completely block off the spiral channel, thus preventing any rotary sliding forward of the solids. Lifting blades arranged in this manner would also lift up and cascade all of the solids and deposit them, due to the inclined slope of the vessel, into a lower and more retarded portion of the spiral channel. This would result in a backward and downward feed through retort 10. However, in accordance with the present invention blades 32 have a length of less than 1 pitch of the flight screw leaving a free space between the end of the blade and the flight adjacent thereto. If the free end of blades 32 points to a flight in a lower position within the retort, the entire amount of material lifted and cascaded by blades 32 may be returned into the channel below. This results in a lesser amount of solids being lifted and cascaded but a greater amount sliding along the advancing screw flights and thus a faster feed rate upwardly through retort 10. On the other hand, if the free end of blades 32 points to a forward flight in a higher portion within retort 10 as shown in Figure 2, then the material that is sliding past blades 32 is advanced upwardly in the retort while the material that is picked up and cascaded by blades 32 drops back into a portion of the spiral channel one-half to one full pitch behind as a result of the pitch of flights 30 and the inclination of retort 10. If there were no lifting blades, then substantially all of the solids would be continuously advanced by sliding along the spiral flight as the vessel rotates. The length of time, the number of cascades and the extent of mixing provided for the solids in the course of their travel through retort 10 may thus be controlled by fixing the length, location, and number of lifting blades 32, and the inclination and speed of the retort 10. The proper length is determined by design considerations as a function of heat transfer requirements and other results desired.

As shown more clearly in Figure 3, retort 10 may also be provided with a plurality of stationary triangular baffles 36 which are arranged across the retort cross-section in a staggered formation to break up and distribute the cascading solids into vertical planes across the path of heating gas and vapors. A fixed crescent-shaped baffle 38 may extend over the full length of retort 10 from fixed cover plate 40 to fixed cover plate 42. Baffle 38 may serve to force the stream of heating gases through the cascading solids and prevent excessive passage of heating gas through spaces through which no solids cascade. In this manner, a more efficient utilization of the sensible heat of the heating gases is accomplished. Baffle 38 may also be used as a stationary support of fixed triangular baffles 36 within retort 10. Baffle 38 is supported at the two fixed ends of the retort.

Baffle 38 may be omitted, however, by positioning lifting blades 32 in the manner shown in Figure 4. In this case blades 32 are placed in the flight so as to form an angle of 5° to less than 45° between the radius of the retort and the blade itself. The end of each blade 32 contains a restricting lip 35 (shown in both Figures 3 and 4) which in combination with the angular position of the blade serves to return the solids to a more advanced position of the blade on its revolution, with the net effect of promoting uniform distribution of the cascading solids over the full cross-section of the retort. Triangular baffles 36 in this case are supported by members running lengthwise attached to the fixed ends of the retort.

Retort 10 may be supported in a conventional manner on rollers 45 and rotated by means of gears 47 and 49 driven by any suitable prime mover, such as an electric motor 50. Rotary retort 10 is fitted with stationary cover plates 40 and 42 through bearing and sealing means 52 and 54, respectively, of the stuffing box or any other suitable conventional type. Cover plate 40 carries gas feed pipe 14 and solids withdrawal line 16 which should be completely filled with solids at all times as shown on the drawing to prevent the escape of gases. Cover plate 42 carries screw conveyor 5, liquid withdrawal line 18 and gas withdrawal line 20. As shown in the drawing, the opening leading into liquid withdrawal line 18 may be covered with a screen, sieve, filter 70, or the like to prevent the entry of solids with the liquid into line 18. A circular dam 71 may also be provided to decrease the amount of solids carried to screen 70 and line 18. This line should also at all times be filled with liquid to provide a liquid seal preventing the escape of gases.

The rotary retort shown in Figure 5 in side elevation is similar to the retort of Figures 2 and 3 with respect to solids and gas feeding means, flight and baffle arrangements within the retort and the provisions made for support and propulsion, like elements being identified by like reference characters. The essential difference between the two retorts resides in the fact that the retort shown in Figure 5 is provided with an upper section 60 which may be rotated independently of the main section of retort 10 and at a different speed. Section 60 has separate roller supports 62 and is driven by a separate prime mover 64 via separate gears 66 and 68. The speed of rotation of section 60 is preferably faster than that of the main body of retort 10. In this case, section 60 is provided with screw flights 30 having a shorter screw pitch and/or with lifting blades 32, the length of which is greater in relation to the pitch of screw flights 30, as compared with the corresponding elements in the main body of retort 10. In this manner, the feed rate of solids through the entire retort may be substantially constant while the solids are lifted more rapidly at this throughput and a greater amount of solids is maintained in the cascading state per unit of time in section 60 as compared with the remaining portion of the retort. Such a condition is highly desirable in case a combustion zone is maintained in section 60 because it provides for a maximum of contact between the incoming air and the combustible solids.

The embodiments of the invention illustrated in Figures 2 and 5 may both be further modified by providing a section of increased diameter at one end of rotary retort 10, preferably at the lowered solids feed end. This arrangement affords an increased time of contact between gases and solids by a reduction of the gas velocity and an increase of the cascading time which results from the larger free space through which the solids may drop.

Other modifications within the spirit of the invention may appear to those skilled in the art.

The invention will be further illustrated by the following specific example.

*Example*

For the distillation of about 1,000 tons per day of Colorado shale crushed to an average size of about ½ in. particle diameter and containing about 30–40 gals. of oil per ton, a rotary retort of the type illustrated in Figure 2 having a diameter of about 10–12 ft. and a length of about 80–120 ft. may be used. Approximately 9,000–13,000 standard cu. ft. of air are supplied through line 14. Proper heat balance may in general be maintained if the retort is so operated that the spent shale is discharged through line 16 at temperatures within the range of 1,000°–1,500° F. Spiral flights 30 and lifting blades 32 should be so arranged that about 50% of the solid material cascaded from the lifting flights drop into the channel portion from which they are lifted and about 50% into an upwardly advanced position. The angle of inclination of rotary retort 10 may be about 2°–10°. The screw flights 30 may have a pitch of 1–4 ft. The number of lifting blades 32 may be about 2–8 per pitch and the length about 5–60% of the space between two screw flights.

The foregoing description and exemplary operation have served to illustrate specific modifications of the invention but are not intended to be limiting in scope.

What is claimed is:

1. The process of distilling carbonaceous solids with gases which comprises passing subdivided solids upwardly over an extended, inclined, confined space defining a path, in a tumbling highly agitated motion while lifting and cascading said solids through said space on their passage over said path so as to establish an overall upward motion of said solids on said path while continuously returning portions of said cascading solids to a point on said path below the point from which they have been lifted, passing a hot gas downwardly over said path countercurrently to said solids and in direct heat exchange therewith, said gas being introduced at a relatively high temperature in the uppermost portion of said path and withdrawn from the lowermost portion of said path at a relatively low temperature, said solids being introduced in the lowermost portion of said path at a relatively low temperature and withdrawn from the uppermost portion of said path at a relatively high temperature, the temperature of said gas and solids decreasing continuously from said uppermost to said lowermost portion, maintaining said high gas temperature conducive to the volatilization of volatilizable constituents of said solids, maintaining said low gas and solids temperatures conducive to the condensation of said volatilized constituents, and withdrawing liquid product from the lower portion of said path.

2. The process of claim 1 in which said high temperature is maintained by subjecting combustible solid constituents to combustion in said uppermost portion.

3. The process of claim 2 in which said combustion is maintained by introducing air in the said uppermost portion.

4. The process of claim 3 in which said solids comprise oil shale.

5. A rotary retort comprising in combination an inclined cylindrical elongated shell rotatably supported and closed at its lower and upper ends, means for feeding subdivided solids into said lower end, means for removing subdivided solids from said upper end, a continuous spiral screw blade attached with its outer spiral edge to the walls of and arranged within said shell and having a free inner edge so as to form a screw-like member extending substantially over the entire length of said shell and having a plurality of parallel helical sectional walls, said sectional walls being arranged substantially perpendicularly with respect to the longitudinal axis of said shell, said free inner spiral edge defining a free cylindrical space co-axial with said cylindrical shell, a plurality of blades attached to said sectional walls in a position substantially perpendicular to said sectional walls, each of said blades being substantially parallel with the axis of said shell and forming an acute angle with the plane tangent to said shell along the line of intersection between each of said blades and said shell, said blades extending longitudinally across a portion only of the distance between two of said sectional walls, and extending laterally from said shell to said free inner edge means for supplying a gas to said upper end, means for withdrawing a gas from said lower end, means for rotating said shell, and means in said lower end for withdrawing liquid, each of said sectional walls being provided with at least one opening adjacent to said shell permitting the passage of liquid.

6. The retort of claim 5 which comprises a circular overflow dam arranged adjacent to, and at the retort inlet side of, said liquid withdrawal means, said dam retaining solids advanced by said screw-like member but permitting the overflow of liquids to said liquid withdrawal means.

7. The retort as claimed in claim 5 which comprises a plurality of stationary angular baffles extending substantially horizontally over at least a substantial portion of the cross-section of said shell at positions intermediate between points of greatest distance on said shell.

8. The retort of claim 7 in which said baffles are arranged in a spaced relationship and staggered in height over the length of said shell.

9. The retort of claim 5 which comprises a crescent-shaped stationary baffle extending within said co-axial space over substantially the entire length of said shell and arranged with its convex portion adjacent to that side of said shell which is moving upwardly in the course of rotation, the greatest thickness of said crescent baffle not exceeding one-half of the diameter of said shell.

10. The retort of claim 5 in which those ends of said blades which point toward the axis of said retort are bent at an angle so as to point in the general direction of rotation of said retort.

WALTER A. REX.
HERBERT H. VICKERS.

References Cited in the file of this patent

UNITED STATES PATENTS

| Number | Name | Date |
|---|---|---|
| 1,272,377 | Catlin | July 16, 1918 |
| 1,474,357 | Gercke | Nov. 20, 1923 |
| 1,500,323 | Jenkins | July 8, 1924 |
| 1,534,737 | Reed | Apr. 21, 1925 |
| 1,547,331 | Kacser | July 28, 1925 |
| 1,995,873 | Vandergrift et al. | Mar. 26, 1935 |
| 2,071,534 | Ingraham | Feb. 23, 1937 |
| 2,219,407 | Baptist | Oct. 29, 1940 |
| 2,287,437 | Lesher | June 23, 1942 |
| 2,441,386 | Berg | May 11, 1948 |

FOREIGN PATENTS

| Number | Country | Date |
|---|---|---|
| 113,674 | Switzerland | Feb. 19, 1925 |
| 291,550 | Great Britain | June 7, 1928 |